United States Patent Office 3,399,706
Patented Sept. 3, 1968

3,399,706
PROCESS FOR TREATING RACING TIRES WITH PERCHLOROETHYLENE, NAPHTHA AND A RUBBER SOLVENT AND COMPOSITION
George Prusha, 50 Bronson St., Berea, Ohio 44017
No Drawing. Filed Oct. 5, 1965, Ser. No. 493,246
11 Claims. (Cl. 152—211)

ABSTRACT OF THE DISCLOSURE

A composition comprising a major proportion of perchloroethylene, about 25 to about 30% of a high naphtha boiling at least at 300° F., and about 25% to 10% of a hydrogen-containing rubber solvent boiling below 300° F. is suitable for application to the tread portions of tires (particularly miniature racing tires) to decrease slippage, prevent dust pickup during races on a closed track. The composition is also applicable for treating belts, friction clutches and the like.

---

The present invention relates to an organic liquid composition and a process for conditioning and vitalizing the tire treads of model and full size racing tires and more particularly to a composition containing a major amount of perchloroethylene and a substantial amount of a high boiling petroleum distillate together with a minor amount of a conventional rubber solvent.

In recent years many thousands of people have become interested in the sport of racing miniature electrically driven cars, known as "slot cars," which travel at very high speeds sometimes in excess of 90 miles per hour. Thousands of tracks for these model cars are listed in the official registers. Because the races cover 400 or more laps, the condition of the rubber tires is extremely important. The slot cars must skid around corners and yet have the proper traction. If the friction is too great and the tires do not skid properly, then the car will overturn on the curves unless the speed is drastically reduced.

Prior to the present invention, attempts have been made to increase the speed of slot cars by treating the rubber tires with a rubber solvent or other liquid material, such as toluene or glycerine, but this did not provide a satisfactory solution to the problem. The ordinary rubber solvents evaporate too quickly and tend to catch fire. The above treating liquids often tend to make the rubber too sticky so that the cars turn over on the curves. In general, the treating liquids known prior to this invention did not remain effective for an adequate period of time, particularly in the 400 lap races.

The present invention involves the discovery of an organic liquid treating composition for racing tires which is much more effective than any compositions previously used. This composition comprises a major portion by weight of perchloroethylene or the like, about 25 to about 30% by weight of a naphtha or the like having a boiling range of about 300° to about 500° F., and about 25 to about 10% by weight of a conventional rubber solvent, which is more volatile. For some reason, this composition is ideal for use on the miniature tires of slot cars and remains effective for very long periods of time. Apparently one reason for this is that there is less tendency to lose traction by pickup of dust and dirt. The composition of this invention increases the traction sufficiently to permit a great increase in speed throughout the race and permits the rear tires of the car to skid outwardly in the proper way as the car is guided at high speed around the curves. The composition not only reduces fish-tailing but also reduces spinout and flip damage. Also it is safe to use because it will not support combustion. If a flash occurs, it is self-extinguishing.

While the composition of this invention is principally used for the tires of miniature cars, it is useful with the various types of natural and synthetic rubber tires including those used on modern full size racing cars, such as drag racers, because of the great improvement in traction.

An object of the present invention is to provide racing tires with maximum traction while at the same time allowing the tire to skid in the proper manner around curves, thereby reducing spin-out and flip damage.

Another object of the invention is to provide the tires with the maximum traction while reducing the pick-up of dust or dirt by the tire treads.

Another object of the invention is to reduce fish-tailing during races.

A still further object of the present invention is to provide a treating composition for tire treads which has reduced tendency to be evaporated by heat but nevertheless is highly effective in swelling the rubber.

Another object of the invention is to provide a flame-resistant treating composition which removes glaze and cleans and softens the rubber of tires, belts, friction clutches and the like.

These and other objects, uses and advantages of the invention will become apparent to those skilled in the art from the description and claims which follow.

The novel treating composition of the present invention is useful on natural or synthetic rubber tires or tires made from a mixture of natural and synthetic rubbers including conventional SBR rubber tires, butyl rubber tires and nitrile rubber tires. The composition may be applied to the tire treads in various ways and is preferably worked into the tires by the fingers shortly before a race. As the car is raced on the track, the heat generated by the tires will eventually cause the composition to evaporate, but the composition of this invention will remain effective much longer than any composition previously known.

The principal ingredient of the tire treating composition of this invention is perchloroethylene ($CCl_2CCl_2$) or the like, although some of the advantages of the invention may be obtained using a mixture of that compound with a minor amount of other halogenated organic liquid of high boiling point, tetrachloromethane and/or bromotrichloromethane. Best results are obtained using perchloroethylene as the only or at least the major part of the halogenated liquid. The composition of this invention should contain about 50 to about 60% by weight of perchloroethylene.

The composition of this invention also contains about 25 to about 30% by weight of a petroleum distillate or the like, such as an aliphatic naphtha or other hydrocarbons having a boiling range of 300° to 500° F. A major proportion of this organic liquid should have a boiling point of 350° or higher. The naphtha or other petroleum base liquid preferably has a boiling range of 350° to 450° F. Conventional petroleum naphthas are suitable, but it is preferable to employ naphthas containing no more than 5% by weight of aromatic hydrocarbons. The aliphatic naphthas should be used, and best results are obtained with naphthas which are essentially paraffin liquids.

The high-boiling naphtha mentioned above is not effective by itself. In order to swell the rubber of the tire tread and obtain adequate traction, it is necessary to employ, as a third ingredient, a substantial amount of a volatile rubber solvent. The composition of the present invention contains, in addition to said naphtha, about 10 to about 25% by weight of a conventional rubber solvent, such as a petroleum distillate. This solvent must have a boiling range from about 100° F. to about 300° F., and a major portion of the solvent should have a boiling point above 150° F. Best results are obtained when a major portion of the rubber solvent has a boiling range of 170° F. to 250° F. Although ordinary gasoline is a solvent for rubber, it should not be used because of the fire danger. For safety reasons the rubber solvent should be of the aliphatic type and should contain no more than 5% by weight of aromatic compounds. Most of the rubber solvents commonly used in the building of rubber tires may be used.

In practicing this invention, it is preferable to use the conventional low cost petroleum distillates sold by the oil companies. Excellent results can be obtained using as the rubber solvent an aliphatic solvent, such as Sohio 1028 rubber solvent which has the following properties:

|  |  | ASTM tests |
|---|---|---|
| Gravity, ° API at 60° F | 68.1 | D-287 |
| Specific gravity at 60° F | | |
| Pounds per gallon | | |
| Distillation range, ° F | | D-86 |
| IBP | 117 | |
| 10% | 148 | |
| 50% | 186 | |
| 90% | 232 | |
| DP | 278 | |
| Color, Saybolt | +30 | D-156 |
| Doctor | Sweet | D-484 |
| Corrosion at 212° F | 1B | D-130 |
| Kauri-butanol value | 36.5 | D-1133 |
| Aniline cloud point, ° F | 135 | D-1012 |
| Odor | Mild | |
| Acidity | Pass | D-1093 |
| Composition, percent volume | | D-1319 |
| Paraffins | 86.0 | |
| Olefins | 2.0 | |
| Naphthenes | 10.0 | |
| Aromatics | 2.0 | |
| Sulfur | .01 | D-1266 |

Although various petroleum naphthas are suitable, including some mineral spirits, it is desirable to use an essentially aliphatic odorless solvent, such as Sohio 3454 Special Odorless Naphtha which has the following properties:

|  | Odorless Naphtha 3440 | Special Odorless 3454 | ASTM Test |
|---|---|---|---|
| Gravity, ° API at 60° F | 54.6 | 53.6 | D-287 |
| Specific gravity at 60° F | .7603 | .7645 | |
| Lbs. per gal. at 60° F | 6.3 | 6.4 | |
| Distillation range, ° F | | | D-86 |
| IBP | 350 | 358 | |
| 10% | 355 | 362 | |
| 50% | 363 | 374 | |
| 90% | 375 | 432 | |
| DP | 380 | 488 | |
| Color, Saybolt | +30 | +25 | D-156 |
| Flash point, ° F | 125 | 135 | D-56 |
| Kauri butanol value | 27 | 26 | D-1133 |
| Aniline cloud point | 184 | 185 | D-611 |
| Corrosion, copper strip | 1B | 1B | D-130 |
| Saturated hydrocarbons | 100%(MS) | 100%(IR) | |
| Sulfur | Nil | Nil | |

As an example of the process of this invention a treating composition is prepared by mixing 27 parts by weight of Sohio 3454 odorless naphtha with 54 parts of perchloroethylene and 19 parts of Sohio 1028 rubber solvent. The resulting liquid composition, when applied to the SBR rubber tire treads of model electric racing cars and worked or rubbed in with the fingers, enables these cars to run at much higher speeds without picking up dust and without tipping over or spinning out on the curves. It has been found that slot cars having tires treated with this composition will consistently win races when in competition with similar cars having the same tires treated with other materials. The proportions of ingredients are critical, and substantially different proportions do not provide practical results for these toy racing cars.

The composition of the above example has also been found very effective for use on the large rear tires of modern drag racers and is particularly desirable because of the non-flammability, the reduction of tendency to pick up dust, and the ability of the liquid to remain effective on the heated tire surfaces for a long period of time. The composition is highly effective when using major amounts by weight of the perchloroethylene even though the amounts of the highly volatile rubber solvent are relatively small.

Another advantage of the composition of this invention is that it removes glaze while cleaning and softening the rubber. This property is highly advantageous in treating articles other than racing tires, such as belts, friction clutches and the like. Thus the organic composition is useful when applied to the rubber of automotive fan belts or other V-belts or slip clutches, such as those used on rotary mowers.

It will be understood that the above description is by way of illustration rather than limitation and that, in accordance with the provisions of the patent laws, variations and modifications of the specific processes and compositions disclosed herein may be made without departing from the spirit of the invention.

Having described my invention, I claim:

1. An organic liquid composition for treating tire treads of model or full size racing tires comprising about 50 to about 60 percent by weight of perchloroethylene, about 25 to about 30 percent by weight of an aliphatic naphtha with a boiling point of at least 300° F., and about 25 to about 10 percent by weight of an aliphatic hydrogen containing rubber solvent, a major portion of said solvent having a boiling range of about 100° F. to about 250° F.

2. A process of treating a vulcanized rubber tire tread comprising applying to the tread an organic liquid tire composition comprising about 50 to about 60 percent by weight of perchloroethylene, about 25 to about 30 percent by weight of an aliphatic naphtha with a boiling range of about 300° to about 500° F., and about 25 to about 10 percent by weight of a volatile hydrogen containing rubber solvent having a boiling range of about 100° F. to about 250° F.

3. A process comprising applying an organic liquid composition to the vulcanized rubber tires of a racing car, and then driving the car at high speed to heat the tires and thereby cause evaporation of said composition, said composition comprising about 50 to about 60 percent by weight of perchloroethylene, about 25 to about 30 percent by weight of aliphatic hydrocarbons with a boiling range of about 300° to about 500° F., and about 25 to about 10 percent by weight of a volatile hydrogen containing rubber solvent having a boiling range of about 100° F. to about 250° F.

4. A liquid composition for treating vulcanized rubber tire treads of racing cars comprising about 50 to about 60 percent by weight of perchloroethylene, about 25 to about 30 percent by weight of aliphatic petroleum fractions with a boiling range of about 300° to about 500° F., and about 25 to about 10 percent by weight of an aliphatic rubber solvent having a boiling range of about 100° to about 290° F.

5. A composition as defined in claim 3 wherein a major portion of said petroleum fractions has a boiling point of about 350° F.

6. A composition as defined in claim 5 wherein a major portion of said rubber solvent has a boiling point of about 150° to about 250° F.

7. An organic liquid composition for treating vulcanized rubber tire treads of model racing tires comprising about 50 to about 60 percent by weight of perchloroethylene, about 25 to about 30 percent by weight of an aliphatic naphtha with a boiling range of about 350° to about 500° F., and about 25 to about 15 percent by weight of a volatile aliphatic hydrogen containing rubber solvent with a boiling range of about 100° to about 300° F., a major portion of said rubber solvent having a boiling point of about 170° F. to 250° F.

8. An organic liquid composition as defined in claim 7 containing less than 5% by weight of aromatic compounds.

9. A vulcanized rubber racing tire having a tread surface treated with an organic liquid comprising about 50 to about 60 percent by weight of perchloroethylene, about 25 to about 30 percent by weight of a naphtha with a boiling range of about 300° to 500° F., a major portion of said naphtha having a boiling range of about 350° to about 450° F., and about 25 to about 10 percent by weight of an aliphatic rubber solvent comprising petroleum fractions with a boiling range of about 100° to about 300° F., a major portion of said solvent having a boiling point of at least 150° F.

10. A process of treating a vulcanized rubber racing tire comprising covering the road-engaging surface of the tire with an organic liquid comprising about 50 to about 60 percent by weight of perchloroethylene, about 25 to about 30 percent by weight of an aliphatic naphtha with a boiling range of about 350° to 500° F., and about 25 to about 10 percent of an aliphatic hydrocarbon solvent for said rubber comprising petroleum fractions with a boiling range of about 100° F. to about 300° F.

11. A process of treating a used rubber belt comprising applying to the wearing surface of the belt an organic liquid comprising about 50 to about 60 percent by weight of perchloroethylene, about 25 to about 30 percent by weight of an aliphatic naphtha with a boiling range of about 350° to 500° F., and about 25 to about 10 percent of an aliphatic hydrocarbon solvent for said rubber comprising petroleum fractions with a boiling range of about 100° F. to about 300° F.

References Cited
UNITED STATES PATENTS

| | | | |
|---|---|---|---|
| 1,715,589 | 7/1925 | Boynton | 252—172 |
| 2,212,761 | 12/1938 | Webster | 252—172 |

JAMES A. SEIDLECK, *Primary Examiner.*

T. MORRIS, *Assistant Examiner.*